Feb. 21, 1950     C. B. WOODWORTH     2,498,323
INDICATOR CALIPER
Filed Sept. 7, 1948
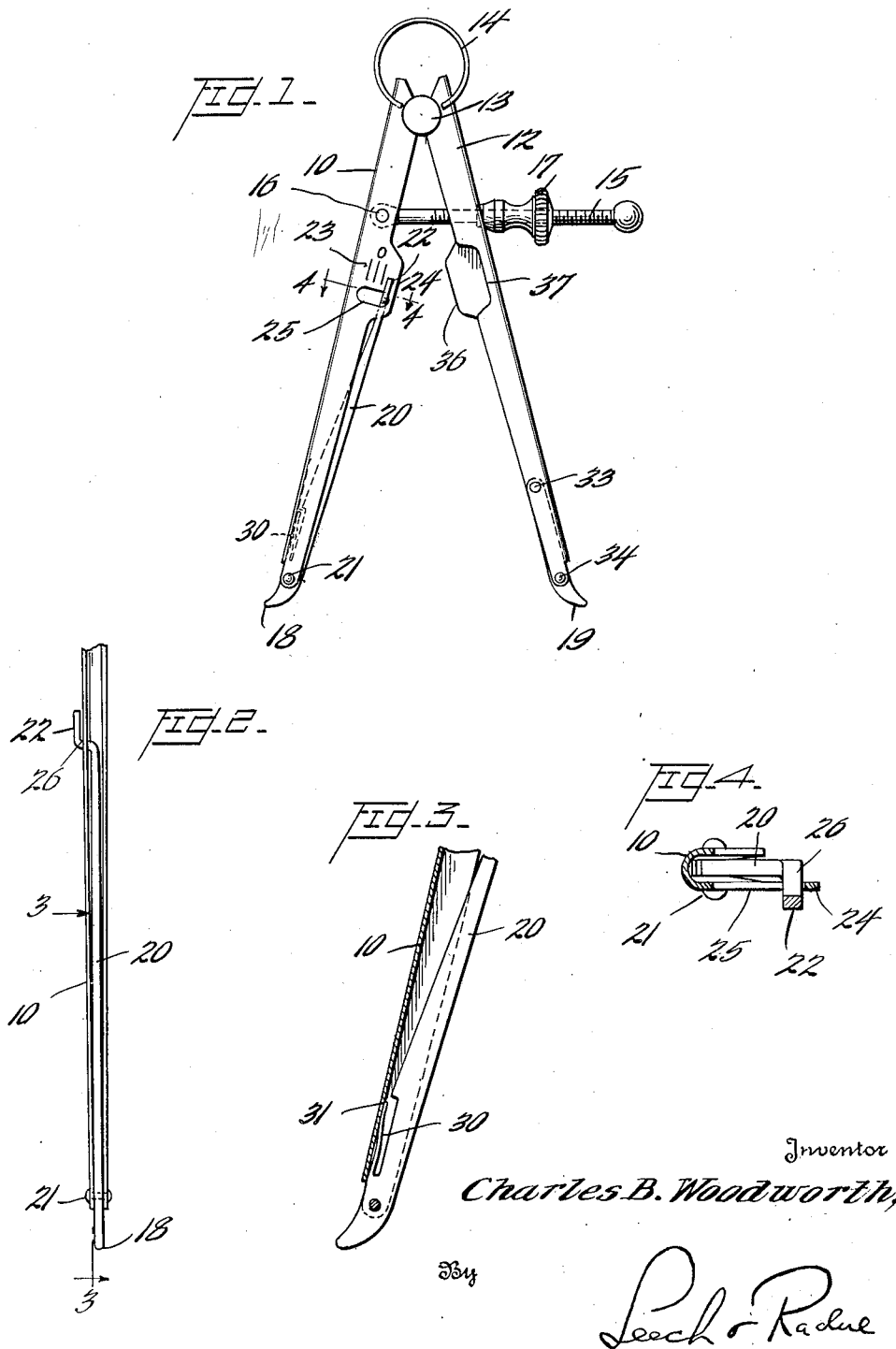
Inventor
Charles B. Woodworth,
By
Leech & Radue
ATTORNEYS Patented Feb. 21, 1950

2,498,323

UNITED STATES PATENT OFFICE 2,498,323

INDICATOR CALIPER

Charles B. Woodworth, Binghamton, N. Y.

Application September 7, 1948, Serial No. 48,061

4 Claims. (Cl. 33—148)

This invention relates to calipers and more particularly to what is known as indicating calipers, having a separate engaging point for one of the legs mounted on an arm pivoted thereto and carrying a pointer playing over a scale.

It is a general object of the present invention to provide a novel and improved indicating caliper of the type described.

More particularly, it is an object of the invention to provide, in an indicating caliper, a hollow or channel-shaped leg adapted to house a pivoted arm carrying the engaging point.

An important feature in accordance with the above object includes the formation of the hollow leg from sheet metal of U-shaped or flat tubular cross section adapted to house the arm and having a slot in one portion thereof through which an offset pointer at the end of the arm passes to cooperate with an exterior scale.

Another important feature of the invention resides in the provision of a spring integral with or secured to the arm and cooperating with a wall of the hollow housing leg serving to urge the pointer to its limit in a direction opposite to that caused by pressure on the engaging point.

Other and further objects and features of the invention will be more apparent to those skilled in the art upon a consideration of the accompanying drawing and the following specification wherein is disclosed a single exemplary embodiment of the invention with the understanding that such changes and modifications may be made therein as fall within the scope of the appended claims without departing from the spirit of the invention.

In said drawing:

Figure 1 is a front side elevation of an indicator caliper incorporating the features of the present invention;

Figure 2 is an edge elevation looking from inside of the leg housing the indicator arm and shown on an enlarged scale;

Figure 3 is a longitudinal central section of the lower portion of the leg taken on line 3—3 of Figure 2; and Figure 4 is a transverse section through the leg in the area of the slot and showing the offset pointer passing therethrough.

In using calipers for accurate machine work, it is desirable to have some means other than the feel of the engaging points on the work for determining the accuracy of measurement or noting variations in what are supposed to be identical dimensions. Thus, in measuring the diameter of a hole which may not be exactly round, it is desirable to be able to determine to dimensions as small as fractions of a thousandths of an inch the out of roundness but only a very skilled mechanic could make such a determination by the mere feel of the engaging points of the caliper with the work. The present invention provides for indicating directly by means of a multiplying lever, such small changes in the dimensions being measured from the setting of the caliper.

The invention, while shown in connection with an inside caliper, can with the same facility be applied to an outside caliper and the showing is in no wise limiting.

Referring now to the drawing, there is shown an inside caliper of generally conventional type having a pair of legs 10, 12 hinged at 13 and urged toward an open position by means of ring spring 14. The usual threaded adjusting rod 15 is pivoted at 16 to leg 10 and passes through an aperture in leg 12 and receives a knurled nut 17 which may be adjusted against the outside of this latter leg to set and maintain any desired adjustment or spacing between the engaging points 18 and 19 at the ends of the caliper legs.

The engaging point 19 is fixed and rigid in respect to the leg 12 while the point 18 is at the outer end of an integral curved extension of an elongated arm or multiplying lever 20 which is pivoted at 21 close to the lower end of leg 10 and very near the tip 18. In order to house the arm 20 to protect it throughout its length and to simplify the construction of the leg 10, it is formed hollow as a tube bent from sheet metal or as shown to a U-shaped cross section with the closed portion of the U facing outwardly. The lever 20 including its integral engaging point 18 which is curved as shown is just slightly less in thickness than the parallel spacing of the two legs of the U. The pivot 21 is secured in apertures at the end of the leg 10 and passes with a working fit through an opening in the arm 20.

The arm 20 tapers toward its upper end as shown where it is reduced to a narrow indicator tip 22 which plays over a scale 23 engraved on the face of the outer leg of the U in a widened area 24 therein. In order that the arm may pass from within the leg to the outside thereof, so that the pointer may cooperate with the external scale, the leg has a closed transverse slot 25 therein through which the offset portion 26 of the pointer end of the arm passes. This slot also serves the purpose of limiting the movement of the arm in either direction by engagement of this offset portion with the ends thereof.

In the use of the instrument, it is desired that the engaging tip 18 be extended to its maximum by spring action and this is conveniently achieved either by striking out from the outer edge of the arm 20 just above its tip the long, thin integral spring tongue 30 or by soldering or otherwise securing a separate spring thereto. The end of such spring is bent away from the arm so that it may engage at 31 against the bottom wall of the U forcing the portion of the arm above the pivot away from this bottom. In the inside caliper this is toward the other leg of the caliper and in the outside type away from the other leg. This produces an extremely simple construction for all that is added to the one caliper leg is the one-piece arm combining the spring and the engaging point. A second element comprises the rivet 21.

For convenience in manufacturing, the second leg 12 may also be formed of sheet metal of tubular or U-shaped cross section and its engaging point 19 may be made from a piece like the lower portion of arm 20, secured in fixed position by rivets 33 and 34. In order that but a single form need be punched for the two legs, the extension 24 of leg 10 appears on the opposite side at 36 on leg 12 and is received in a notch corresponding to that shown at 37 in leg 12 but which is hidden in leg 10. The notch in leg 10 accommodates the extension 36 on leg 12 while the notch 37 in leg 12 accommodates extension 24 whereby the points of the caliper may be brought very close together since the inner faces of the two legs may be brought into engagement.

The housing of the arm 20 within the leg 10 not only protects it and simplifies its construction, but reduces the over-all dimension at the lower end of the caliper permitting measurement, in the case of inside calipers, to much smaller dimensions.

In use, the desired space between the engaging points 18 and 19 is achieved by setting between gauge blocks or the anvils of a micrometer caliper and it is preferred to adjust the caliper of the present invention so that the pointer 22 is in alignment with the zero or center line on the scale. Then when the caliper is applied to the object to be measured, variations in either direction from the desired dimension will be indicated by deviation of the pointer from this zero index.

The ratio of arm lengths from 18 to 21, 21 to 22, is about 20:1 so that minute variations in the object being measured are greatly multiplied on the scale to indicate deviation from the desired dimension.

I claim:

1. In a caliper of the type described, in combination, a pair of caliper legs hinged together, one of said legs being of channel shape in cross-section with the groove facing inwardly, an arm in said channel having an engaging point extending beyond the end of said leg, means near the engaging point pivoting said arm to said leg, an offset pointer on the opposite end of said arm, a scale on one side face of the arm-supporting leg over which the pointer plays, a slot in said leg adjacent said scale to pass the offset, the ends of said slot limiting the movement of the pointer in each direction, and a spring cooperating with the arm and its leg to urge the pointer to the limit of its movement in one direction, said arm-supporting leg being formed of sheet metal to a hollow cross-section whereby it houses said arm.

2. The caliper as defined in claim 1 in which one flange of the channel of said leg is widened adjacent the pointer end to accommodate the scale on the outer face thereof, said slot being through said widened portion.

3. In a caliper, in combination, a pair of pivotally connected caliper legs, one of said legs being of channel shape in cross-section with the groove facing inwardly, an arm in said channel having a measuring point extending beyond the end of the leg, means pivoting the arm to the leg near the end of the latter, a portion of one flange of said leg near the center thereof being widened laterally and having a closed end lateral slot therein and a scale adjacent the slot, said arm being offset to pass through said slot, a pointer on said offset portion cooperating with said scale, and a spring engaging said arm above its pivot to urge the pointer against the slot end opposite to that caused by pressure on the measuring point.

4. The caliper as defined in claim 3 in which the opposite leg is cut away to receive the said widened portion of the first leg to permit closing of the legs for small measurements.

CHARLES B. WOODWORTH.

REFERENCES CITED

The following references are of record in the file of this patent:

UNITED STATES PATENTS

| Number | Name | Date |
|---|---|---|
| 579,951 | Bystrom | Apr. 6, 1897 |
| 613,814 | Benes | Nov. 8, 1898 |
| 769,908 | Lamb | Sept. 13, 1904 |
| 844,772 | Bernegau | Feb. 19, 1907 |
| 1,435,630 | Cichy et al. | Nov. 14, 1922 |
| 1,645,473 | Cash | Oct. 11, 1927 |
| 2,187,519 | Meilner | Jan. 16, 1940 |
| 2,216,916 | Jones | Oct. 8, 1940 |

FOREIGN PATENTS

| Number | Country | Date |
|---|---|---|
| 585,685 | France | Dec. 12, 1924 |
| 552,021 | Great Britain | Mar. 19, 1943 |